United States Patent

[11] 3,586,936

[72] Inventor Robert P. McLeroy
Miramar, Fla.
[21] Appl. No. 866,984
[22] Filed Oct. 16, 1969
[45] Patented June 22, 1971
[73] Assignee C & B Corporation

[54] VISUAL TUNING ELECTRONIC DRIVE CIRCUITRY FOR ULTRASONIC DENTAL TOOLS

6 Claims, 1 Drawing Fig.

[52] U.S. Cl. .......... 318/118, 310/8.1, 310/26
[51] Int. Cl. .......... H01v 9/00
[50] Field of Search .......... 318/118, 116, 114, 130, 133; 310/8.1, 26, 73; 340/248—253

[56] References Cited

UNITED STATES PATENTS

| | | | |
|---|---|---|---|
| 2,105,479 | 1/1938 | Hayes | 318/118 X |
| 3,056,124 | 9/1962 | Young | 340/253 |
| 3,152,295 | 10/1964 | Schebler | 318/118 |
| 3,447,051 | 5/1969 | Attwood et al. | 318/118 X |

*Primary Examiner*—D. F. Duggan
*Attorneys*—Ernest H. Schmidt and Franklin D. Jankosky

ABSTRACT: Solid state electronic circuitry for driving the magnetostrictive transducer of ultrasonic dental tools is described, wherein tuning to resonance is controlled by circuit adjustment to maximum brightness of a tuning indicator lamp. Variation of brightness of the lamp as a function of tuning accuracy is achieved by feeding a reference voltage proportional to the excitation current flowing through the ultrasonic transducer to the input of a differential amplifier stage to compare it with a preset reference voltage. The varying output voltage thus derived is amplified to provide an energization current for the indicator lamp which will be proportional to the transducer excitation current and thus an indication of tuning to resonance.

PATENTED JUN 22 1971 3,586,936
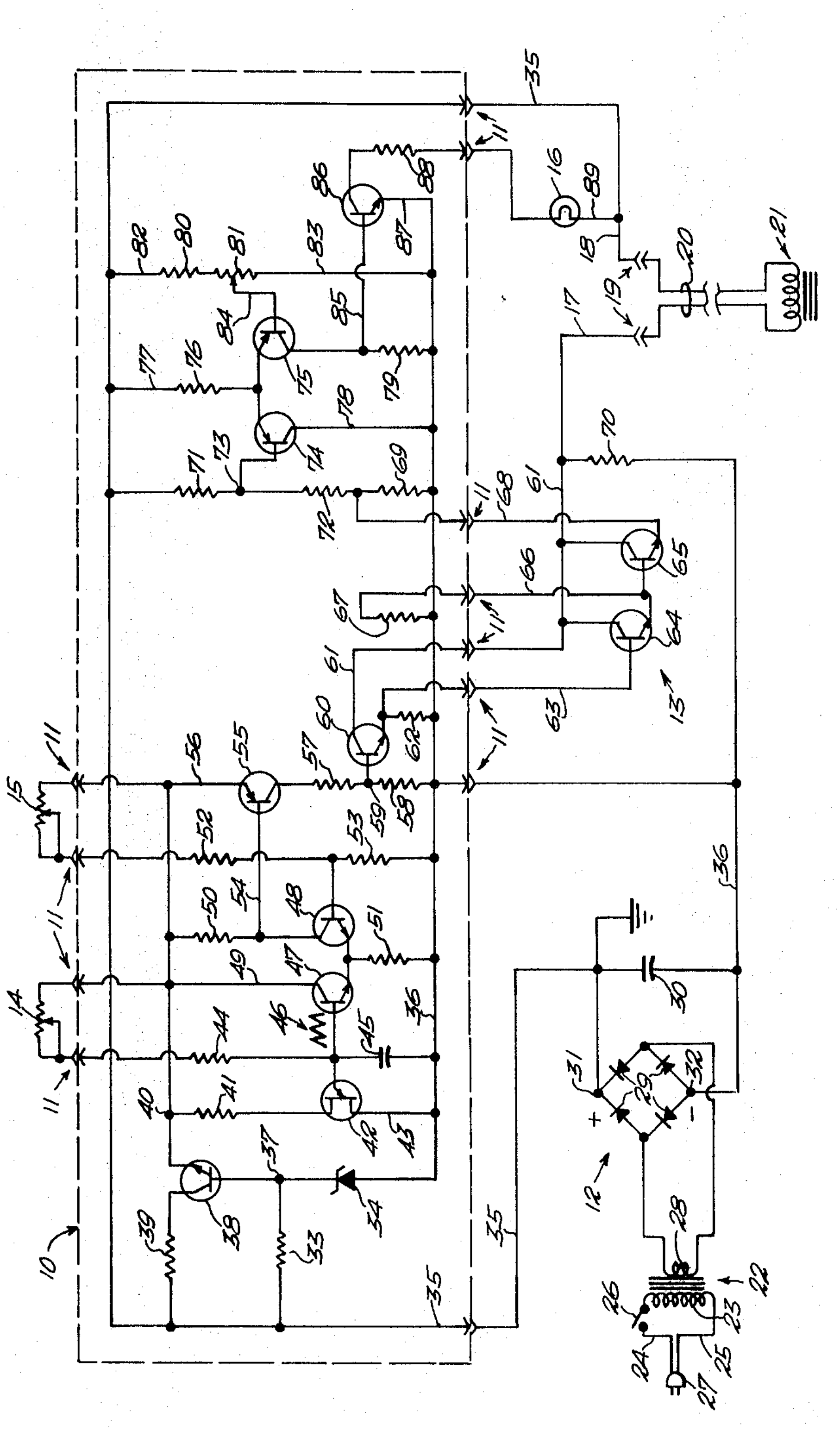
INVENTOR
ROBERT P. McLEROY
BY Ernest H. Schmidt
ATTORNEY

VISUAL TUNING ELECTRONIC DRIVE CIRCUITRY FOR ULTRASONIC DENTAL TOOLS

The use of dental tooth-cleaning tools including a magnetostrictive transducer operative at ultrasonic frequencies and connected to the tool tip supplied with a coolant such as water is known. Reference can be had to U. S. Pat. No. 3,368,280, issued Feb. 13, 1968, to C. M. Friedman et al., titled DENTAL TOOL, for a detailed description thereof. It is the principal object of this invention to provide novel and improved solid state electronic circuitry for driving the magnetostrictive transducer of such ultrasonic dental tools.

In order to effect proper and efficient operation of ultrasonic dental tools, it is, of course, necessary that the electronic drive circuitry be precisely tuned to the resonant frequency of the magnetostrictive transducer in the instrument. Heretofore, this has been accomplished by observation of the tool tip or probe for maximum activity, particularly with respect to dispersal of the activated coolant, while adjusting a frequency control element comprising the electrical drive circuitry. Such tuning, while suitable for sight tuning or matching of the drive output to the instrument, not only is time-consuming, but also imprecise. It is, accordingly, the principal object of this invention to provide a drive circuit of the character described including visual tuning means in the form of a signal lamp or the like, the brightness of which will be indicative of tuning accuracy.

Drive circuitry for ultrasonic dental tools ordinarily includes means for varying the power output to the tool in accordance with requirements of the dental procedure being undertaken. Such output control has heretofore consisted of electrical means for varying the amplitude of the output drive signal. It is another object of this invention to provide improved and more efficient drive circuitry wherein the power output to the ultrasonic magnetostrictive transducer of the dental tool is controlled by variation of the duty cycle of the ultrasonic frequency signal, rather than by variation of its amplitude.

It is still another object of the invention to provide an electronic drive circuit or power supply for ultrasonic dental tools which will be simple in construction, compact, inexpensive to manufacture, efficient in operation, and dependable and durable in use.

Other objects, features and advantages of the invention will be apparent from the following description when read with reference to the accompanying schematic diagram of the electronic drive circuitry comprising the invention.

Referring now to the schematic diagram, the broken line rectangular enclosure 10 designates a circuit component board upon which the circumscribed circuit elements, being the smaller circuit elements hereinafter more particularly described, are mounted and interconnected. The double arrows about the periphery of the component board 10, designated by reference numeral 11, indicate plug-in jack assemblies by means of which the circuitry of said component board may be removably assembled and electrically interconnected with the remainder of the circuitry, all of which will be housed in a suitable chassis. The circuitry also includes a DC power supply, indicated generally at 12, a power amplifier, indicated generally at 13, a variable resistor frequency control element 14, a variable resistor power output control element 15 and tuning indicator lamp 16, all of which will preferably be mounted in the common chassis into which the component board 10 is plugged. Reference numerals 17 and 18 indicate the power output signal leads in the chassis, which terminate in a receptacle or jack 19 connectable through a flexible cable 20 to the magnetostrictive transducer 21 in the ultrasonic dental tool (not further illustrated herein).

Considering now, in detail, the operation of the electronic circuitry, numeral 22 designates the power input transformer of the power supply 12, the primary winding 23 of which is connected, through power leads 24, 25 in series with an on-off switch 26, to an electrical plug 27 for plug-in connection to a receptacle outlet of an ordinary 115-volt, 60-cycle source of electrical supply, for example. The reduced voltage output derived from the secondary winding 28 of the power input transformer 22 is applied to the input of a full-wave rectifier comprising four diodes 29 interconnected in an ordinary full-wave bridge circuit. The DC output of the bridge rectifier is shunted by a voltage smoothing capacitor 30 to provide an unregulated DC supply voltage between the terminal points indicated at 31 and 32 of the bridge circuit.

The DC output appearing between the points 31 and 32 is connected across a series-type voltage regulator comprising series resistor 33 and "ZENER" diode 34 through conductors 35 and 36 to provide a reference voltage of approximately 15 volts DC appearing with respect to common negative potential at point 37, which reference voltage is applied to the base of an emitter follower regulator transistor 38, the collector element of which is connected to the unregulated source of DC supply voltage through a low-value resistor 39.

The regulated output voltage of approximately 15 volts appearing at the emitter of the transistor 38, indicated at circuit point or junction 40, is connected through current-limiting resistor 41 to one base of a unijunction transister 42, the other base being returned through conductor 43 to common negative potential. The unijunction transistor 42 is utilized as a relaxation oscillator to provide the ultrasonic signal or voltage which is amplified and varied in frequency as hereinafter described to energize the magnetostrictive transducer 21. To this end, an RC circuit comprising variable resistor 14 in series with fixed resistor 44, and capacitor 45, is provided, said resistors being in series between the source of regulated DC voltage supply and the emitter element of the unijunction transistor 42, and said capacitor being connected between said emitter element and common negative potential. The output of the emitter element of the unijunction transistor element 42 is of sawtooth waveform, as indicated at 46, which output signal can be varied in frequency, for example within a frequency range of between 16.5 and 21 kilocycles, by adjustment of the frequency control or tuning variable resistor or potentiometer 14. This variable sawtooth signal or waveform is fed directly into the base element of a transistor 47 which, together with the transistor 48, comprise a differential comparator stage for transforming said sawtooth signal into a signal voltage of substantially square waveform of variable pulse width or duty cycle.

The collecter element of the transistor 47 is connected directly to the regulated source of DC supply voltage through conductor 49, and the collector element of transistor 48 is connected to said source of supply through a load resistor 50. The emitter elements of transistors 47 and 48 are returned to common negative potential through a common bias resistor 51. A voltage divider circuit including variable resistor or potentiometer 15, and resistors 52 and 53 connected in series across the regulated source of DC voltage supply, provide a reference voltage at the junction between said resistors 52 and 53 which is applied directly to the base element of the output transistor 48. The voltage divider resistors 15, 52, and 52 and 53, and the bias resistor 51, are so chosen that the clipped square wave output appearing across the load resistor 50 (at the frequency determined by the setting of the frequency control resistor, as described above) can be varied over a three-to-one range in duty cycle by adjustment of the variable resistor 15 to provide a wide range of power output control.

The output of the differential comparator output transistor 48 is fed through conductor 54 to the base element of common emitter transistor 55 comprising a voltage amplifier-buffer stage. The emitter element of the transistor 55 is connected to the source of regulated DC supply voltage through conductor 56, and the collector element thereof is returned to common negative potential through series bias resistors 57 and 58 which, at their junction point 59, provide a low impedance output signal for driving the base element of a common collector connected transistor 60 utilized as a current amplifier stage. The collector element of the transistor 60 is returned to the unregulated source of DC voltage supply through conductor 61, series-connected magnetostrictive transducer 21 and conductor 35. The transistor 60 is biased by a bias resistor 62 connected between its emitter element and common negative potential. The current amplifier output signal of the transistor 60 appearing at its emitter element is fed through conductor 63 to the base element of the first transistor 64 constituting the driver of a two-stage series-connected power amplifier including output transistor 65. The emitter element of the driver transistor 64 is returned to common negative potential through conductor 66 and bias resistor 67. The emitter element of the power output transistor 65 is returned to common negative potential through conductor 68 and bias resistor 69. The collector elements of each of the transistors 64 and 65 are connected to the load comprising the magnetostrictive transducer 21 through a conductor 61, flexible cable 20 and the conductor 35 leading to the unregulated source of DC voltage supply. A magnetic bias resistor 70 shunted between the load side of the magnetostrictive transducer 21 and common negative potential provides a bias current through said transducer at all times when the output transistor 65 is nonconducting to insure efficient operation of said transducer along the straight-line portion of its saturation curve.

Electronic means is provided to vary the energizing current applied to the tuning indicator lamp 16 in accordance with accuracy of tuning, that is, to achieve the maximum brilliance of said lamp upon adjusting for maximum current through the transistor 21, indicative of resonance. To this end, series-connected voltage divider resistors 71 and 72 are connected in series with power output bias resistor 69 across the unregulated source of DC supply to provide a reference voltage appearing at junction point 73 between voltage divider resistors 71 and 72 which will be proportional to the current flowing through said output bias resistor, said current, in turn, being proportional to the excitation current flowing through the transducer 21. The reference voltage appearing at junction point 73 is fed directly to the base element of transistor 74 which, together with a companion transistor 75, comprise a differential amplifier stage. The emitter elements of the transistors 74 and 75 are joined together and biased by a common bias resistor 76 returned to the unregulated source of DC voltage supply through conductors 77 and 35. The collector element of transistor 74 is connected directly to common negative potential through conductor 78, and the collector element of transistor 75 is connected to common negative potential through load resistor 79. The differential amplifier comprising transistors 74 and 75 compares the variable reference voltage appearing at the input junction point 73 with a preset voltage obtained from a voltage divider circuit comprising series-connected resistor 80 and potentiometer 81 connected across the unregulated source of DC voltage supply through conductors 82 and 83. This preset voltage appearing at the potentiometer contactor arm is fed directly to the base element of transistor 75 through conductor 84. The varying output voltage of the output transistor 75 of the differential amplifier appearing at the collector element end of the output resistor 79 is fed through conductor 85 directly to the base element of a current amplifier stage comprising common emitter connected transistor 86. The emitter element of the current amplifier or drive transistor 86 is returned to common negative potential through conductor 87, and the output signal appearing at the collector element of said transistor is fed in series through current-limiting load resistor 88 to the tuning indicator lamp 16, said tuning lamp indicator being returned to the unregulated source of DC supply through conductor 89. In operation, circuit parameters and component values are so chosen, particularly with respect to the positional adjustment of the potentiometer 81 (which, once set will thereafter not ordinarily be disturbed), as to provide for maximum brilliance of the tuning indicator lamp 16 upon effecting maximum current through power output bias resistor 69, that is, upon achieving resonance or maximum efficiency of operation of the transducer.

While I have illustrated and described herein only one form in which the invention can conveniently be embodied in practice, it is to be understood that this form is presented by way of example only and not in a limiting sense. For example, instead of using an incandescent lamp, a current meter or any other electrical device responsive to change in electric current could be used as the tuning indicator. The invention, in brief, comprises all the embodiments and modifications coming within the scope and spirit of the following claims.

What I claim is new and desire to secure by Letters Patent is:

1. Electronic drive circuitry for exciting a magnetostrictive transducer used in ultrasonic dental tools and the like comprising, in combination, a source of DC potential, a solid state ultrasonic oscillator energized by said source of DC potential and providing a substantially sawtooth waveform output signal voltage, a power amplifier energized by said source of DC potential and having an input controlled by said output signal voltage, said power amplifier providing a power output signal, an ultrasonic transducer energized as the load of said power output signal, indicator means responsive to current flowing through said transducer to visually indicate tuning to resonance thereof upon variation of said frequency of said sawtooth waveform output, (Electronic drive circuitry for exciting a magnetostrictive transducer, as defined in claim 1, wherein) said indicator means (comprises) comprising a current-responsive visual indicator and a differential amplifier stage having an input transistor and an output transistor, circuit means responsive to load current flowing through said power amplifier and providing a substantially proportional DC reference voltage, said reference voltage being applied to a controlling element of said input transistor, a predetermined comparison DC voltage applied to a controlling element of said second transistor, and a load resistor for said second transistor providing a variable output voltage for energization of said current-responsive visual indicator.

2. Electronic drive circuitry for exciting a magnetostrictive transducer, as defined in claim 1, wherein said oscillator is in the form of an RC relaxation circuit.

3. Electronic drive circuitry for exciting a magnetostrictive transducer, as defined in claim 2, wherein said RC relaxation circuit comprises means for varying the frequency of said sawtooth waveform output.

4. Electronic drive circuitry for exciting a magnetostrictive transducer, as defined in claim 3, wherein said sawtooth waveform output is variable within the frequency range of between 16.5 and 21 kilocycles.

5. Electronic drive circuitry for exciting a magnetostrictive transducer, as defined in claim 1, wherein said visual indicator comprises an incandescent lamp.

6. Electronic drive circuitry for exciting a magnetostrictive transducer used in ultrasonic dental tools and the like comprising, in combination, a source of DC potential, a solid state ultrasonic oscillator energized by said source of DC potential and providing a substantially sawtooth waveform output signal voltage, a transistor power amplifier energized by said source of DC potential and having an input controlled by said output signal voltage, a DC bias circuit including a bias resistor for said power amplifier, said power amplifier providing a power output signal, an ultrasonic transducer energized as the load of said power output signal, and indicator means responsive to current flowing through said bias resistor to visually indicate tuning to resonance of said transducer upon variation of said frequency of said sawtooth waveform output, said bias resistor being operative as a current-limiting resistor with respect to said power amplifier upon accidental short circuiting of said transducer.